United States Patent
Athsani et al.

(10) Patent No.: US 9,607,096 B2
(45) Date of Patent: *Mar. 28, 2017

(54) SYSTEM AND METHOD FOR CONTENT ACCESS CONTROL

(71) Applicant: Yahoo! Inc., Sunnyvale, CA (US)

(72) Inventors: Athellina Athsani, San Jose, CA (US); Elizabeth F. Churchill, San Francisco, CA (US); Joseph O'Sullivan, Oakland, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/312,385

(22) Filed: Jun. 23, 2014

(65) Prior Publication Data

US 2014/0304283 A1    Oct. 9, 2014

Related U.S. Application Data

(63) Continuation of application No. 12/248,650, filed on Oct. 9, 2008, now Pat. No. 8,763,087.

(51) Int. Cl.
  *G06F 15/16*   (2006.01)
  *G06F 17/30*   (2006.01)
  *G06F 21/10*   (2013.01)
(52) U.S. Cl.
  CPC .......... *G06F 17/3089* (2013.01); *G06F 21/10* (2013.01)
(58) Field of Classification Search
  CPC .............................. G06F 17/3089; G06F 21/10

USPC ...... 709/246, 247, 229; 726/4, 7; 725/54, 92
See application file for complete search history.

(56) References Cited

U.S. PATENT DOCUMENTS

| | | | |
|---|---|---|---|
| 6,189,101 B1 * | 2/2001 | Dusenbury, Jr. .. | H04L 29/12009 713/162 |
| 6,338,094 B1 | 1/2002 | Scott et al. | |
| 6,658,428 B2 * | 12/2003 | Sokol .................. | G06F 17/2745 |
| 6,665,659 B1 * | 12/2003 | Logan ............... | G06F 17/30864 |
| 6,976,090 B2 * | 12/2005 | Ben-Shaul .......... | G06F 17/3089 707/E17.116 |
| 7,272,662 B2 * | 9/2007 | Chesnais ............. | H04L 12/5835 709/230 |
| 7,320,068 B2 * | 1/2008 | Zimniewicz ........... | G06Q 30/02 709/220 |
| 7,564,992 B2 | 7/2009 | Rhoads | |
| 7,748,027 B2 | 6/2010 | Patrick | |
| 7,925,708 B2 * | 4/2011 | Davis ................... | G06Q 10/107 707/706 |
| 7,984,098 B2 * | 7/2011 | Enete .................. | H04L 12/1822 709/204 |

(Continued)

*Primary Examiner* — Thu Ha Nguyen
(74) *Attorney, Agent, or Firm* — Hickman Palermo Becker Bingham LLP; Daniel D. Ledesma

(57) ABSTRACT

A system and method for managing access to content is provided. One example embodiment provides for a method including acts of identifying a filter of content based at least in part on the preferences a user and a subject presented in the content and presenting the content using the filter to the user. Another example embodiment provides for a system that includes a controller configured to identify a filter of content based on preferences of a user, to present content using the identified filter and to update the preferences of the user based on feedback from the user and the subjects presented in the content.

20 Claims, 7 Drawing Sheets

(56) References Cited

U.S. PATENT DOCUMENTS

| | | | |
|---|---|---|---|
| 8,069,169 B2* | 11/2011 | Fitzpatrick | G06F 17/30867 707/732 |
| 8,150,416 B2* | 4/2012 | Ribaudo | G01S 5/0018 370/338 |
| 8,250,614 B1* | 8/2012 | Ellis | H04N 21/4334 725/100 |
| 8,281,027 B2* | 10/2012 | Martinez | H04L 67/18 709/203 |
| 8,347,360 B2* | 1/2013 | Schultz | G06F 21/604 340/5.1 |
| 8,554,835 B1* | 10/2013 | Williams | G06Q 50/01 705/319 |
| 8,589,548 B2* | 11/2013 | Karaoguz | H04N 7/163 348/207.1 |
| 2002/0010798 A1* | 1/2002 | Ben-Shaul | G06F 17/3089 709/247 |
| 2002/0042923 A1* | 4/2002 | Asmussen | G06F 17/30017 725/92 |
| 2002/0112035 A1* | 8/2002 | Carey | G06F 17/30867 709/219 |
| 2003/0078078 A1* | 4/2003 | King | H04M 1/72544 455/566 |
| 2003/0137542 A1* | 7/2003 | Zimmerman | G06F 9/4443 715/764 |
| 2006/0136393 A1* | 6/2006 | Abbott | G06F 17/30867 |
| 2006/0278064 A1* | 12/2006 | Lourdeaux | G06F 17/30867 84/609 |
| 2007/0042792 A1* | 2/2007 | Perfetto | H04M 3/42263 455/461 |
| 2007/0081197 A1* | 4/2007 | Omoigui | G06F 17/30528 358/403 |
| 2007/0112762 A1* | 5/2007 | Brubaker | G06F 17/30867 |
| 2007/0264948 A1* | 11/2007 | Jansson | G06F 1/3209 455/127.5 |
| 2009/0254971 A1* | 10/2009 | Herz | G06Q 10/10 726/1 |
| 2009/0300671 A1* | 12/2009 | Scott | H04N 21/4755 725/27 |
| 2010/0146553 A1* | 6/2010 | Lo | H04N 5/44543 725/54 |
| 2010/0223349 A1* | 9/2010 | Thorson | G06Q 10/107 709/206 |
| 2010/0235748 A1* | 9/2010 | Johnson | G06Q 30/00 715/730 |
| 2010/0241507 A1* | 9/2010 | Quinn | G06Q 30/02 705/14.42 |
| 2010/0293601 A1* | 11/2010 | Schultz | G06F 21/604 726/4 |
| 2011/0066706 A1* | 3/2011 | Ostrover | H04N 7/163 709/219 |
| 2011/0125743 A1* | 5/2011 | Immonen | G06F 17/30241 707/737 |
| 2011/0208822 A1* | 8/2011 | Rathod | G06Q 30/02 709/206 |
| 2011/0289153 A1* | 11/2011 | Hull | G06Q 10/107 709/205 |
| 2011/0289574 A1* | 11/2011 | Hull | G06Q 10/107 726/7 |
| 2012/0023522 A1* | 1/2012 | Anderson | G06Q 30/02 725/35 |
| 2012/0084349 A1* | 4/2012 | Lee | G06Q 30/02 709/203 |
| 2012/0331516 A1* | 12/2012 | Perez Martinez | H04L 63/0245 726/1 |
| 2013/0061260 A1* | 3/2013 | Maskatia | G07F 17/005 725/28 |
| 2013/0086653 A1* | 4/2013 | Gupta | H04W 4/005 726/5 |
| 2013/0097664 A1 | 4/2013 | Herz et al. | |
| 2014/0032721 A1 | 1/2014 | Karaoguz et al. | |
| 2014/0143831 A1* | 5/2014 | Fieweger | H04L 9/3231 726/3 |
| 2014/0189818 A1* | 7/2014 | Meyer | G06F 21/62 726/4 |
| 2015/0163206 A1* | 6/2015 | McCarthy | G06F 21/6227 713/171 |

\* cited by examiner

SYSTEM AND METHOD FOR CONTENT ACCESS CONTROL

CROSS-REFERENCE TO RELATED APPLICATIONS; BENEFIT CLAIM

This application is a Continuation of U.S. patent application Ser. No. 12/248,650, filed Oct. 9, 2008, the entire contents of which is hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

BACKGROUND

1. Field of the Invention

At least one embodiment in accord with the present invention relates generally to content management technologies, and more specifically, to management of electronic content.

2. Discussion of Related Art

Many users of the internet currently leverage various websites and software to share a variety of content with other users. Some websites, such as Yahoo, YouTube, and FaceBook, provide users with facilities to publish content they create and to review content created by others. Some websites allow users, such as producers of this user generated content (UGC), to express UGC in any of several expressive media. Examples of media used to express UGC include, among others, text, audio, video and multi-media combinations of these.

Some of these websites provide users with facilities to identify an audience of content consumers who may experience the UGC produced by the user. Often, these facilities allow the user to specify individuals and groups of individuals that share common UGC access characteristics. For example, a user may define a collection of users and group the users into two groups, a family group and a friends group. The user may then allow members of the family group to view one particular set of content, such as a family photo album, and may allow members of the friends group to view another particular set of content, such as photographs of the friends. These identification facilities are a useful tool for users to manage access to UGC.

SUMMARY OF THE INVENTION

Aspects in accord with the present invention manifest an appreciation that users, such as producers and consumers of content, would benefit from more precise and automatic management of access to content than is available using conventional technology. For example, users may want to manage access to certain portions of the content based on attributes of the consumers of content, attributes of the content itself or metadata describing the consumers or the content. Thus at least one embodiment in accord with the present invention provides for a system that enables enhanced control of content publication and consumption.

According to one embodiment, a method for providing content to a plurality of users with each user of the plurality of users having preferences to subjects presented in the content is provided. The method includes acts of identifying a filter of the content based at least in part on the preferences of at least one user and at least one subject presented in the content, presenting the content using the filter to the at least one user, receiving, from the at least one user, an indication of a preference of the at least one user to the presented content and updating the preferences of the at least one user based at least in part on the indication and the at least one subject. In the method, identifying the filter may include identifying the filter based at least in part on the filter being configured to include the at least one subject. Additionally, identifying Is the filter may include identifying the filter based at least in part on the filter being configured to exclude the at least one subject. Moreover, identifying the filter may include identifying a filter that is configured to allow an indicated user of the plurality of users to receive the content. Further presenting the content using the filter may include presenting the content using the filter to the indicated user of the plurality of users. Further still, identifying the filter that is configured to allow the indicated user of the plurality of users to receive the content may include identifying a filter that is configured to allow any of the plurality of users associated with indicated geo-based data to receive the content. In addition, identifying the filter may include identifying a filter that is configured to allow an indicated user group to receive the content and presenting the content using the filter may include presenting the content using the filter to the indicated user group.

In the method, presenting the content using the filter may include presenting a region of an image. Moreover, presenting the content using the filter may include presenting a subset of frames included in a video. Additionally, presenting the content using the filter may include presenting a frequency range in audio data. Furthermore, presenting the content using the filter includes presenting an indicated alphabet of textual data.

The method may include an act of indicating, by the at least one user, the preferences of the at least one user. The method may also include an act of indicating, by a preference engine, the preferences of the at least one user based on other information regarding the at least one user. The method may further include an act of creating the filter by at least one second user. Moreover, the method may include an act of indicating, by the at least one second user, that the filter matches at least one preference of the at least one user. In addition, the method may include an act of indicating, by a preference engine, that the filter matches at least one preference of the at least one user. Furthermore, the method may also include an act of indicating, by a producer of the content, that the at least one user is allowed to receive content using the filter and identifying the filter may include identifying the filter based at least in part on the at least one user being authorized to use the filter. In the method, indicating, by the producer of the content, may include indicating that any of the plurality of users associated with identified geo-based data is allowed to receive content. The method may also include an act of uploading, by a producer, the content to a content server.

According to another embodiment, a system for providing a portion of content to a user is provided. The system includes a computer readable medium configured to store preferences of the user to subjects presented in content, a first input configured to receive an indication of a user's preference to subjects presented in the content, an output configured to provide filtered content to the user and a controller coupled to the computer readable medium, the first input and the output and configured to identify a filter based at least in part on the preferences of the user, to present the filtered content using the identified filter and to update the preferences of the user based on the indication and the subjects presented.

In the system, the subjects presented may include at least one person. Additionally, controller may further configured to implement a preference engine that is arranged to record the preferences of the user based on information concerning the user. The system may also include a second input configured to receive the content from a producer. Furthermore, the controller may be further configured to arrange the preference engine to record that the filtered content matches at least one preference of the user.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
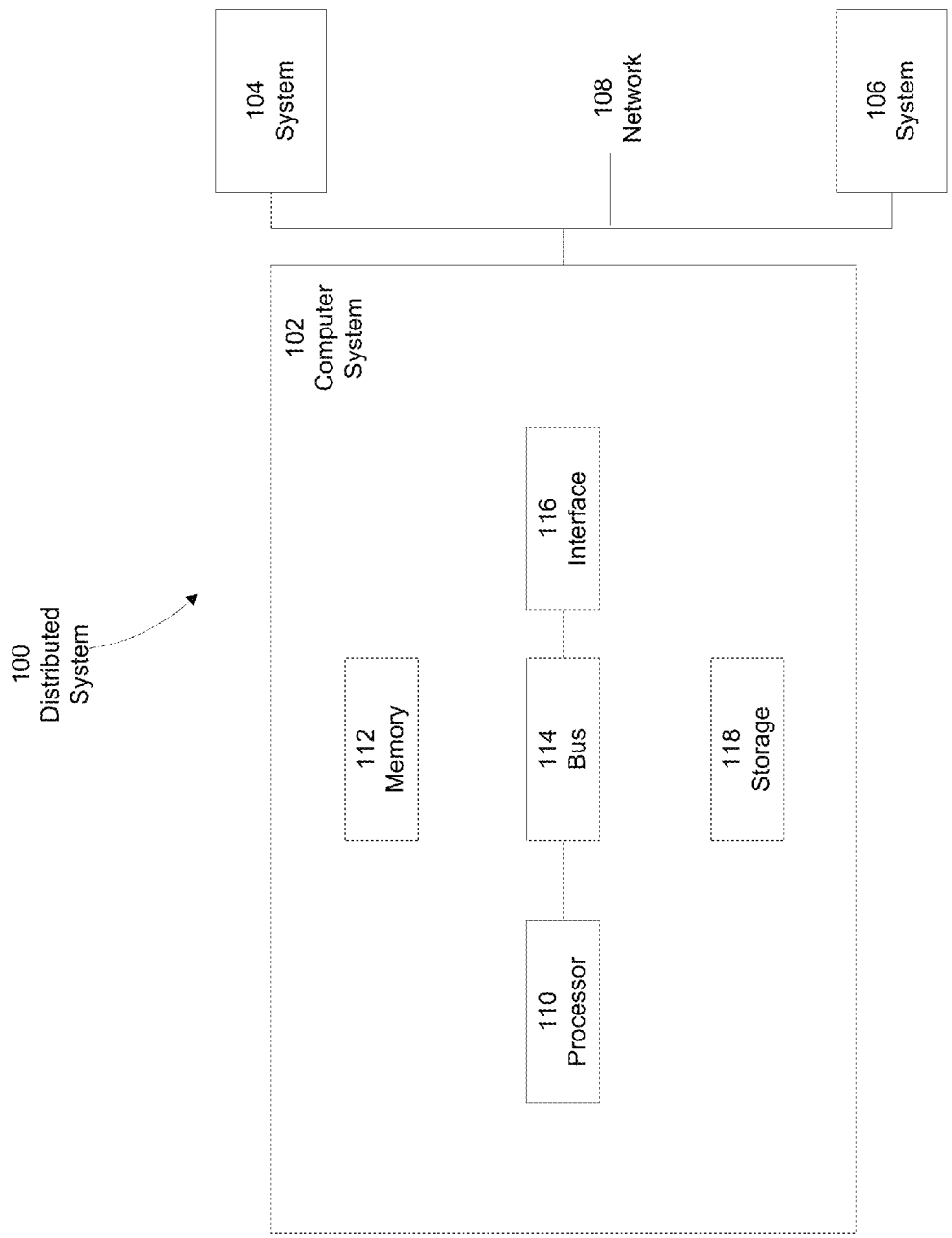
FIG. 1 shows an example computer system upon which various aspects in accord with the present invention may be implemented.

At least one embodiment in accord with the present invention relates to a system that may enable a user, such as a producer of UGC, to manage access to portions of content based on characteristics of the content, characteristics of the consumer and metadata describing the content or the consumer. Content may include a single portion of content, such as, for example a photograph, or a set of related content, such as, for example, a photo album. According to one embodiment, a user may manage access to content by filtering the content into discrete portions. In this example, filters may include or exclude any of the attributes of the content. By creating multiple filters, producers may provide audiences with many different experiences from a single element of content.

In an embodiment, filters may include parameters that define which attributes to include or exclude in a presented portion of content. According to another embodiment, the particular parameters included in a filter may be explicitly or implicitly defined. Additionally, filters may be associated with particular users or groups of users, such as a community or audience of users. Filters may also be associated with a particular element of content or sets of content. Both producers and consumers of content may utilize these filters to efficiently and effectively manage access to content.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a general purpose computer system is configured to perform any of the functions described herein, including but not limited to, storing, editing, categorizing, and retrieving filters of content. However, such a system may also perform other functions, such as suggesting filters of content to users, based on, for example, attributes of the content. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

General Purpose Computer System

Various aspects and functions described herein in accord with the present invention may be implemented as hardware or software on one or more computer systems. These computer systems may be, for example, general purpose computers such as those based on Intel PENTIUM-type processor, Motorola PowerPC, AMD Athlon or Turion, Sun UltraSPARC, Hewlett-Packard PA-RISC processors, or any other type of processor or controller. Further, aspects may be located on a single computer or may be distributed among a plurality of computers attached by one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more general purpose computer systems. For example, as illustrated, distributed computer system 100 includes general purpose computer systems 102, 104 and 106. As shown, computer systems 102, 104 and 106 are interconnected by, and may exchange data through, communication network 108. Network 108 may include any communication network through which computer systems may exchange data. To exchange data using network 108, computer system 102, 104 and 106 and network 108 may use various methods, protocols and standards known in the art, including, among others, token ring, ethernet, wireless ethernet, Bluetooth, TCP/IP, UDP, HTTP, FTP and SNMP. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accord with the present invention may be implemented as specialized hardware or software executing in one or more computer systems including general purpose computer system 102 shown in FIG. 1. As depicted, computer system 102 includes processor 110, memory 112, bus 114, interface 116 and storage 118. Processor 110 typically performs a series of instructions resulting in data manipulation. Processor 110 is typically a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 is typically used for storing programs and data during operation of computer system 102. Thus, memory 112 is often a relatively high performance, volatile, random access memory such as a dynamic random access memory (DRAM) or static memory (SRAM). However, memory 112 may include any device for storing data, such as a disk drive or other non-volatile storage device.

Components of computer system 102 may be coupled by an interconnection element such as bus 114. Typically, bus 114 includes one or more physical busses (e.g., between components that are integrated within a same machine), but may include any communication coupling between system elements including specialized or standard computing bus technologies such as IDE, SCSI, PCI and InfiniBand. Thus, bus 114 enables communications (e.g., data, instructions) to be exchanged between system components of computer system 102.

Computer system 102 also includes one or more interface devices 116 such as input devices, output devices and combination input/output devices. Interface devices may receive input or provide output. More particularly, output devices typically render information for external presentation. Input devices typically accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118, typically includes a computer readable and writeable nonvolatile storage recording medium in which instructions are stored that define a program to be executed by the processor or information stored on or in the medium to be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. Typically, in operation, the processor causes data to be read from the nonvolatile recording medium into another memory, such as memory 112, that allows for faster access to the information by the processor than does the storage medium included in storage system 118. The memory may be located in storage system 118 or in memory 112, however, processor 110 typically manipulates the data within the memory 112, and then copies the data to the medium associated with storage system 118 after processing is completed. A variety of components are known for managing data movement between the medium and integrated circuit memory element and the invention is not limited thereto. The invention is not limited to a particular memory system or storage system.

Although computer system 102 is shown by way of example as one type of computer system upon which various aspects and functions in accord with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a general purpose computer system including an operating system that manages at least a portion of the hardware elements included in computer system 102. Usually, a processor or controller, such as processor 110, executes an operating system which may be, for example, a Windows-based operating system (e.g., Windows NT, Windows 2000 (Windows ME), Windows XP operating systems) available from the Microsoft Corporation, a MAC OS System X operating system available from Apple Computer, one of many Linux-based operating system distributions (e.g., the Enterprise Linux operating system available from Red Hat Inc.), a Solaris operating system available from Sun Microsystems, or a UNIX operating systems available from various sources. Many other operating systems may be used, and embodiments are not limited to any particular implementation.

The processor and operating system together define a computer platform for which application programs in high-level programming languages are written. These component applications may be executable, intermediate (e.g., C-) or interpreted code which communicate over a communication network (e.g., the Internet) using a communication protocol (e.g., TCP/IP). Similarly, aspects in accord with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used.

Additionally, various aspects and functions in accord with the present invention may be implemented in a non-programmed environment (e.g., documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming languages could also be used.

A general-purpose computer system included within an embodiment may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. However, a general purpose computer system running, for example, SQL Server may be able to support both aspects in accord with the present invention and databases for sundry applications not within the scope of the invention.

Example System Architecture

Figure 2:
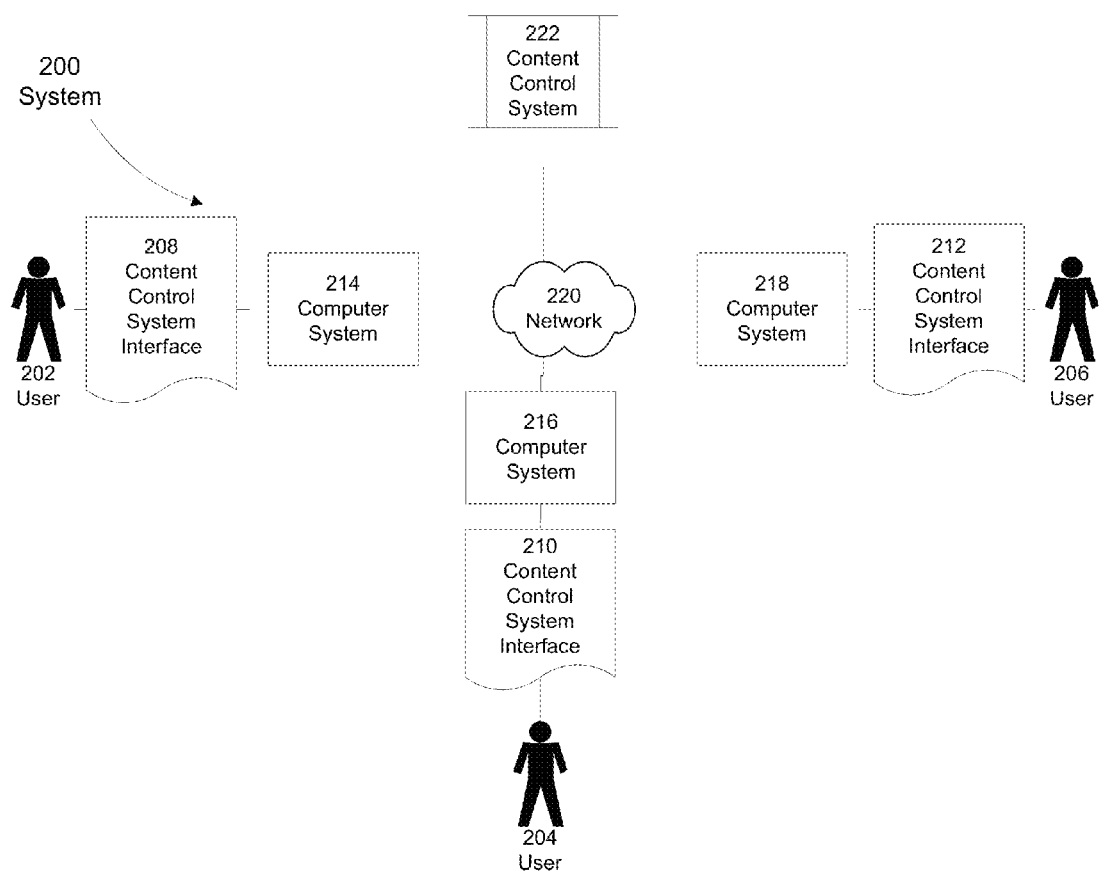
FIG. 2 illustrates an example distributed system including a content control system in according to an embodiment.

FIG. 2 presents a context diagram of distributed system 200 specially configured to include an embodiment in accord of the present invention. Referring to FIG. 2, system 200 may allow system users 202, 204 and 206 to interact with content control system interfaces 208, 210 and 212. According to this embodiment, content control system interfaces 208, 210 and 212 may be served by content control system 222 and may be rendered by computer systems 214, 216 and 218, respectively. Computer systems 214, 216 and 218 may be interconnected with one another and content control system 222 via network 220. Network 220 may include any communication network through which member computer systems may exchange data.

The sundry computer systems shown in FIG. 2, which include computer systems 214, 216 and 218, network 220 and control content system 222 each may include one or more general purpose computer systems. As discussed above with regard to FIG. 1, general purpose computer systems may have one or more processors or controllers, memory and interface devices. Also computer systems 214, 216 and 218 may include one or more mobile computing devices. Example mobile computing devices include cellular phones, personal digital assistants and other types of mobile computer systems. Moreover, computer systems 214, 216 and 218 and control content system 222 may include any sort of general purpose computer system such as a personal computer, a workstation, a mainframe, a networked client, a server, media servers, application servers, database servers, web servers, load balancers, routers and switches. The particular configuration of system 200 depicted in FIG. 2 is used for illustration purposes only and embodiments of the invention may be practiced in other contexts. Thus, the invention is not limited to a specific number of users or systems.

Content control system 222 may manage the content of a large number of users including, among others, users 202, 204 and 206. In one embodiment, users 202, 204 and 206 may interact with content control system interfaces 208, 210 and 212, respectively, to produce and upload content or to upload content produced using other equipment. Users 202, 204 and 206 may publish the content for consumption by themselves or other users.

In one embodiment, content control system 222 may enable identification of one or more subjects of uploaded content via automated or manual facilities. For example, in at least one embodiment, content control system interfaces 208, 210 and 212 may provide elements by which users 202, 204 and 206 may tag content. These tags may be descriptive of the subject of the content.

In another embodiment, content control system 222 may automatically record subjects of content after determining the subjects included in the content via pattern recognition algorithms known in the art. The subjects identified by content control system 222 may include, for example, physical objects depicted in the content, such as people, locations and landmarks or one or more inferences that may be gathered from the information presented in content. For instance, content control system 222 may infer that a picture of a tractor in a field depicts a farm. In this embodiment, users 202, 204 and 206 may or may not be able to modify or delete the automatically generated subjects, depending on how content control system 222 is configured. The generated metadata provides users with an enhance basis of control for content.

Content control system 222 may manage access to content by filtering the content using one or more filters. Filters may include one or more parameters. These parameters may be used by the filter to determine which attributes of content to present to consumers. Parameters may be expressed using various information, including, among other information, attributes of the content, attributes of the consumer and metadata describing the content or the consumer. Examples of common parameters expressed using attributes of the content include, among others, regions in visual content, alphabets, words, paragraphs and chapters for textual content and time periods within motion picture and audio content. Examples of parameters expressed using attributes of the consumer include, among others, content preferences of the consumer, group affiliations of the consumer, the consumer's content consumption history, and demographic information regarding the consumer, e.g. age, gender, place of residence, etc. Examples of parameters expressed using metadata include, among others, the subject of the content, the date the content was produced, the size of the content and geo-based data such as regions, zip codes, area codes, IP addresses, domain names, URLs.

Any of these parameters may be used, individually or in combination, to restrict or allow presentation of the content in its entirety or attributes of the content. Restriction may range from a complete ban on one or more attributes, for example, no portion of the content may be presented, or no audio data may be presented, etc. to a narrowing of the presentation of the one or more attributes, e.g. only audio within a specific range may be presented. Parameters may also cause the presentation to focus on particular attributes. For example, a filter may be created that maintains a particular object at a particular location during the playback of a video.

In another embodiment, a filter may exclude one or more subjects when presenting content to one or more consumers based upon the combination of content and consumer attributes. For example, a filter may remove a gift purchased for, but not yet given to, a family member from a picture including the gift when presenting the picture to the family member. In another example, a filter may remove an individual from a movie when the movie is being viewed by anyone other than the individual.

In embodiment illustrated in FIG. 2, users 202, 204 and 206 may use content control system interfaces 208, 210 and 212 to create filters that filter content according to the various parameters discussed above. For example, in one embodiment, a filter on the content provided to user 202 may include a <parm>no alcohol consumption</parm> parameter, which may indicate that content control system 222 must filter alcohol consumption subjects from content presented to user 202 via content control system interface 208. In another example, using content control system interface 210, user 204 may filter content that may be perceived with multiple senses, such as a multi-media presentation with visual and audio elements, into content that is perceptible by only one sense, e.g. a portion of audio within a define frequency range and time frame or one or more regions within one or more visual frames. Thus, users 202, 204 and 206 may provide highly specialized filters into the content they create.

In one embodiment, any user of content, including producers of content, consumers of content and other entities, such as content control system 222 and other systems, may use filtering to manage access to the content. In this example, filters may be created by any user. Filters may be associated with specific content, sets of content, specific users or user groups. Filters may be modified by the creator of the filter and other authorized users or user groups, e.g. users authorized to modify the filter by its creator or content control system 222. In addition, content control system 222 may support a default filter through which content may be viewed when no other filters apply. Through the use of filters, users may control access to potentially sensitive portions or subjects. For example, a filter may remove subjects depicting the consumption of alcoholic beverages by an individual, such as a the brand name on a bottle, from a movie when the movie is being viewed by family members of the individual.

In the depicted embodiment, content control system interfaces 208, 210 and IS 212 may include facilities for users 202, 204 and 206 to create and manage filters. For example, content control system 222 may enable, through content control system interface 208, user 202 to create content, as discussed above, and one or more filters. User 202 may publish the content and the filters and associate one of the filters with both users 204 and 206 to allow them to experience the content via one of the filters. In one embodiment, user 202 may associate users 204 and 206 with a filter individually, or, if both users 204 and 206 belong to a user group, content control system interface 208 may allow user 202 to authorize both users by authorizing the user group.

Alternatively, user 202 may publish different filters and associated users 204 and 206 with the different filters. These filters may allow users 204 and 206 to experience discrete and distinct portions of the content or may restrict users 204 and 206 from experiencing the portions. For example, a producer may wish to present only audio portions of a home movie to members of an audiophile group and may wish to present only still frames to members of group of photographers.

In another embodiment, content control system 222 may evaluate content and provide users 202, 204 and 206 with suggestions on how to filter content. For example, content control system 222 may determine that the content includes an intermission in which little or no content is present, such as a period of silence in audio or blank screen in video, and suggest that temporal location as a parameter to a filter. In another embodiment, content control system 222 may discern suggested filters based on the subject of the content. For example, content control system 222 may determine that a subject of the content has changed, e.g. a character in a play has left the stage, and suggest one filter terminate access to the content relatively close to change in subject and another filter begin access relatively close to the change.

In another embodiment, content control system 222 may evaluate the content preferences of one or more users or user groups and provide users with suggestions on how to filter content. For example, content control system 222 may determine that a subject of the content is not preferred by a particular target audience of users or user groups and may suggest filtering of the content to avoid the content. Content control system 222 may determine the target audience in a variety of ways. For example, content control system interfaces 208, 210 and 212 may include elements enabling users 202, 204 and 206 to specify a target audience. Content control system 222 may also determine the target audience automatically, based on a number of factors relating to the producer or the consumer of the content including, among others, the logical location to which the content is being published, the content preferences of the user, the publication history of the user, age, gender, and geo-based data, such as the current location of a user or the residence of a user.

Once the target audience is discerned, content control system 222 may suggest filtering that results in access to portions excluding the irrelevant or non-preferred content. For example, if the content is a cookbook and the target audience is a vegetarian, content control system 222 may suggest that only recipes including no meat be included in a portion published to the vegetarian. This automated filtering of content eases the burden of uploading and tailoring content to suit the content preferences of users.

In the illustrated embodiment, content control system 222 may provide content for users 202, 204 and 206 to experience through content control system interfaces 208, 210 and 212. This content may be served to the content control system interface associated with the consumer user as received by content control system 222 or may be filtered through one or more filters. For example, user 202 may publish content and a filter and associate the filter with user 204. User 204 may create a filter and associate the filter with the content published by user 202. Under this example configuration, content control system 222 will present the content through the filter created by the producer, user 202, and through the filter created by the consumer, user 204.

In one embodiment, users may provide feedback as to their preferences for content. Users may also provide feedback as to their preferences for filters used on the content. This feedback may be provided to the producer of the content or the creator of the filter. The feedback may be used by content control system 222 to modify content and filters.

For example, in the embodiment illustrated in FIG. 2, content control system 222 may receive feedback from each member of a user group, e.g. users 202, 204 and 206, that a particular element of content contains material that each finds offensive. In response, content control system 222 may create a filter for association with the group that avoids presentation of the content or the particular subject that each member of the group found offensive. Moreover, content control system 222 may track the feedback provided by users and user groups over time and modify various filters to tailor the filters to the preferences of the users and user groups.

Figure 3:
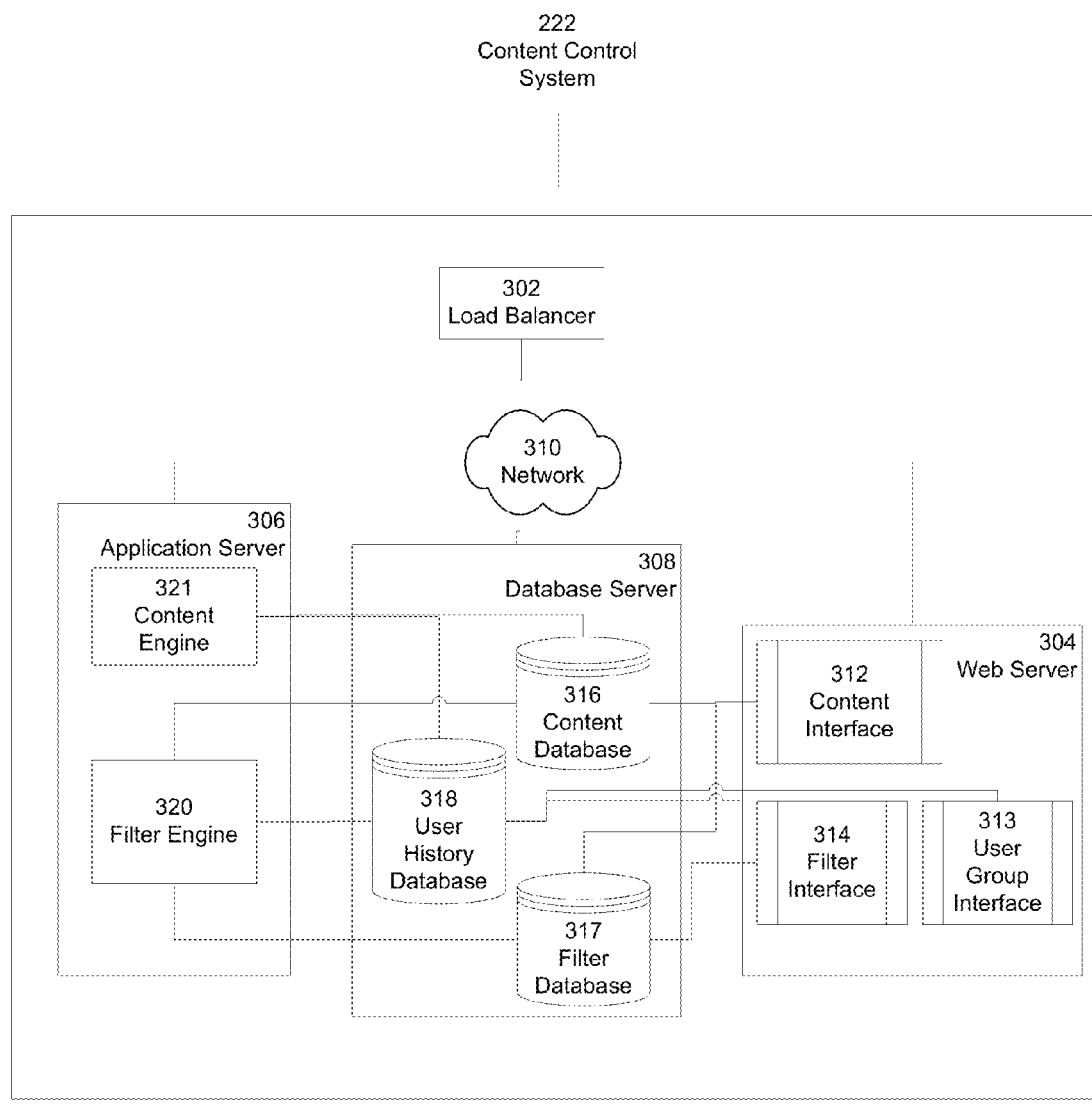
FIG. 3 depicts an example physical and logical diagram for a content control system according to an embodiment.

FIG. 3 provides a more detailed illustration of a particular physical and logical configuration of content control system 222 as a distributed system. The system structure and content recited below are for exemplary purposes only and is not intended to limit the invention to the specific structure shown in FIG. 3. As will be apparent to one of ordinary skill in the art, many variant system structures can be architected without deviating from the scope of the present invention. The particular arrangement presented in FIG. 3 was chosen to promote clarity.

Information may flow between the depicted elements, components and subsystems using any technique known in the art. Such techniques include passing the information over the network via TCP/IP, passing the information between modules in memory and passing the information by writing to a file, database, or some other non-volatile storage device. Other techniques and protocols may be used without departing from the scope of the invention.

In the embodiment illustrated in FIG. 3, content control system 222 includes five primary physical elements: load balancer 302, web server 304, application server 306, database server 308 and network 310. Each of these physical elements may include one or more general purpose computer systems as discussed with reference to FIG. 1 above. Further, in the illustrated embodiment, web server 304 includes two logical elements, user association interface 310 and contextual contact interface 312. Application server 306 includes two logical elements, filter engine 320 and content engine 321. Database server 308 includes three logical elements, content database 316, filter database 317 and user history database 318.

In one embodiment, load balancer 302 may be any conventional load balancer as known to one of ordinary skill in the art and may provide load balancing services to the other elements of content control system 222. Network 310 may include any communication network through which member computer systems may exchange data. Web server 304, application server 306 and database server 308 may be, for example, one or more general purpose computer systems as described above with regard to FIG. 1. Typically, for a high volume website, web server 304, application server 306 and database server 308 will include multiple computer systems, but the invention is not limited to a specific number of computer systems. Web server 304 may serve content using any suitable protocol including, among others, HTML, DHTML, XML and PHP.

In the embodiment illustrated in FIG. 3, content interface 312 may receive content information expressed in various media, for example, photographs, movies, text, music and other material, from users. Further, content interface 312 may provide the content information to users and content database 316. Conversely, content interface 312 may receive content information from content database 316 and may provide the content information to users. Content interface 312 may also receive filter information, for example information including the parameters of a filter, from filter database 317.

User group interface 313 may receive user group information, such as associations between users and user groups, from users and may provide the user group information to user history database 318. Conversely, user group interface 313 may receive user group information from user history database 318 and may provide the user group information to users. Filter interface 314 may receive filter information from users and may provide the filter information to filter database 317. Conversely, filter interface 314 may receive filter information from filter database 317 and may provide the filter information to users or content interface 312. User history database 318 may receive user history information, such as user system usage statistics, from web server 304. User history database may receive user and user group information from user group interface 313. User history database may provide user, user group and system usage information to user group interface 313, filter engine 320 and content engine 321. Filter engine 320 may receive user history information from user history database 318 and may provide filter to content associations to content database 316 and may provide filter information, such as filter configuration information, to filter database 317. Content engine 321 may receive content information from content database 316 and provide metadata describing content to content database 316. Content engine 321 may also receive user history information from user history database 318.

Content database 316 may include, among other information, information regarding content posted by users. This content information may include content, an indicator of content, an indicator of the logical location (subdirectory, etc. . . . ), one or more associations between the content and one or more users or user groups and one or more associations between the content and one or more filters. Additionally, the content information may include metadata associated with the content, such as one or more subjects of the content.

Filter database 317 may include, among other information, information regarding one or more filters created by users. This filter information may include, for each filter, an indicator of the filter, an indicator of the creator of the filter, one or more parameters for the filter and one or more associations between the filter and one or more users or user groups.

User history database 318 may include information indicating users and user groups and indicating system usage patterns of users and user groups. In one embodiment, user history database may include express content preferences for users and user groups. Specific usage information may include any information needed to determine the various associations that may be created by functions described herein, such as for example, frequency and type of content generated by a user, frequency and type of filters created by a user, frequency of user visits to particular content and demographic information associated with a user. Additionally, user history database 318 may include information regarding the popularity of user published content with particular users and user groups. As discussed below, this system usage and demographic information may allow some embodiments to partially or fully automate the creation of user preferences for filters. User history database 318 may also include user and user group content and filter preference information.

The databases 316, 317 and 318 may take the form of any logical construction capable of storing information on a computer readable medium including flat files, indexed files, hierarchical databases, relational databases or object oriented databases. The data may be modeled using unique and foreign key relationships and indexes. The unique and foreign key relationships and indexes may be established between the various fields and tables to ensure both data integrity and data exchange performance.

According to one embodiment, content interface 312 provides a user interface that enables a user to publish and to experience content controlled content control system 222. Content interface 312 may store content information in content database 316. This content information may include any information that content database 316 is configured to store. Moreover, content interface 312 may retrieve content information from content database 316 for presentation or modification by a user. Content interface 312 may also retrieve filter information from filter database 317. Content interface 312 may include or exclude attributes when presenting content according to the parameters included in the filter information. A particular embodiment of user association interface 312 is discussed with further detail below.

According to another embodiment, user group interface 313 provides a user interface that enables a user to establish associations between the user and one or more user groups. User group interface 313 may store these associations between users and user groups in user history database 318. In addition, user group interface 313 may retrieve group information from user history database 318 for display and modification by a user. User group interface 313 may support any number of nested user group levels, i.e. where a member of a user group may be another user group.

According to another embodiment, filter interface 314 provides a user interface that enables a user to create and modify filters. Filter interface 314 may store created filters in filter database 317. Additionally, filter interface 314 may retrieve filters for display or modification by a user. The filter information manipulated by filter interface 314 may include any information that filter database 317 is configured to hold.

The content interface 312, user group interface 313 and the filter interface 314 each exchange information with various providers and consumers. These providers and consumers may include users and system interfaces. In the exemplary embodiment illustrated in FIG. 3, the users may exchange information with the content interface 312, user group interface 313 and the filter interface 314. In an alternative embodiment, this information may be exchanged with other applications or storage media using system interfaces exposed by each of these elements. Each of these elements may both restrict input to a predefined set of values and validate any information entered prior to using the information or providing the information to other components. These functions may prevent the introduction of erroneous data into the system.

According to another embodiment, content control system 222 contains to preference engines, filter engine 320 and content engine 321. As will be discussed further below, both of these preference engines may review data to find explicit and implicit preferences of users. Filter engine 320 may scan user history database 318 for patterns from which user filter preferences and associations between filters and content may be discerned. Various embodiments may employ a variety of association and preference rules that define under what circumstances associations should be established or preferences inferred. For example, filter engine 320 may determine an implied association between a filter and content based on the filter being used with the content with a threshold degree of regularity.

In one embodiment, filter engine 320 may create a filter based on the content preferences of a user or user group. For example, filter engine 320 may retrieve user content information from content database 316 and may create a filter to suit these preferences. As content control system 222 builds more information regarding user content and filter preferences, this process may be repeated to continually improve the quality of the filters offered by the system.

In another embodiment, filter engine 320 may record a user preference for a filter based on the filter manifesting express or implied content preferences of a user or user group. In this embodiment, filter engine 320 may, for example, compare user content preferences received from user history database 318 to the content filtered by one or more filters. If the filtered content matches a content preference of a user, filter engine 320 may record a user preference for the one or more filters. A user may is provide express feedback regarding his content preferences by providing feedback regarding content and filters via content interface 312 or by using certain filters with a threshold degree of regularity. Implied content preferences may be discerned by content control system 222 through the operation of content engine 321, as discussed below.

In one embodiment, filter engine 320 may record an implied user preference for a filter based on a user's affiliation with a group that prefers the filter. In another embodiment, the filter engine 320 may discern a user preference for a filter based on the filter being used by the user with a threshold degree of regularity. In another embodiment, the filter engine 320 may establish a user preference for a filter based on the frequency with which other users in a user group to which the user belongs make use of the filter. In an additional embodiment, the filter engine 320 may record a user preference for a filter based on the frequency with which another user who has similar system usage patterns, e.g. visiting similar pages, etc. makes use of the filter.

In an additional embodiment, filter engine 320 may establish a user preference for a filter based on demographic or other information describing a user. For example, filter engine 320 may establish a user preference for a filter that magnifies visual content and based on the fact that the user that recently purchased bifocals.

In an alternative embodiment, filter engine 320 may be configured to establish only a subset of the associations established under normal operation. For example, filter engine 320 may be configured to only establish user preferences for filters. In another example, filter engine 320 may be configured to only establish filter to content associations.

In yet another embodiment, filter engine 320 may be configured to establish associations and preferences using a restricted or modified set of association and preference rules. For example, filter engine 320 may be configured to establish user preference for filters based on modified usage thresholds, but not on the frequency that other users make use of certain filters. According to an embodiment, the configurable options of filter engine 320 may be presented to a user through a user interface. Other basis for discerning associations exist and the invention is not limited to the steps of a particular pattern recognition process.

After filter engine 320 discerns a user preference for a filter or a filter to content association, filter engine 320 may store the user filter preference information in user history database 318 or may store the filter to content association in content database 316. In one embodiment, filter engine 320 may transmit an electronic notification, for example an email, to a user when a new filter preference association is created for the user or when a new filter association is created for content associated with the user. In one embodiment, after this filter information is created, it may be modified or removed using content interface 312 or filter interface 314. Thus some embodiments automate the creation of filter preferences and associations.

With further reference to FIG. 3, content engine 321 may scan content included in content database 316 for patterns from which metadata describing the content may be discerned. For example, content engine 321 may analyze content to determine one or more subjects to which the content is directed. In this example, the method of analysis may depend on the medium in which the content is expressed. For instance, if the medium is visual, content engine 321 may use a trained neural network to determine the identity of one or more individuals or objects included in the content. Once metadata describing the content is discerned, content engine 321 may store the metadata in content database 316. In one embodiment, the metadata is stored as tags that user may modify using content interface 312.

In another embodiment, content engine 321 may determine content preferences for users and user groups from information stored in user history database 318. In one embodiment, content engine 321 may discern a content preference for a user based on the frequency with which the user accesses a particular portion of content or content with particular subjects or other common characteristics. In another embodiment, content engine 321 may discern a content preference for a user based upon the user making use of a particular filter with a threshold degree of regularity. Once metadata describing the user content preference is discerned, content engine 321 may store the metadata in user history database 318.

Other embodiments may employ a physical configuration different from that illustrated in FIG. 3. For example, in one embodiment, content control system 222 may include one or more application servers dedicated to receiving content from users and generating filter suggestions. In the another embodiment, content control system 222 may include one or more application servers dedicated to implementing filters and receiving feedback regarding filters and filtered content from users. Thus the present invention is not limited to any specific physical configuration.

Content and Filter Feedback Loops

Figure 4:
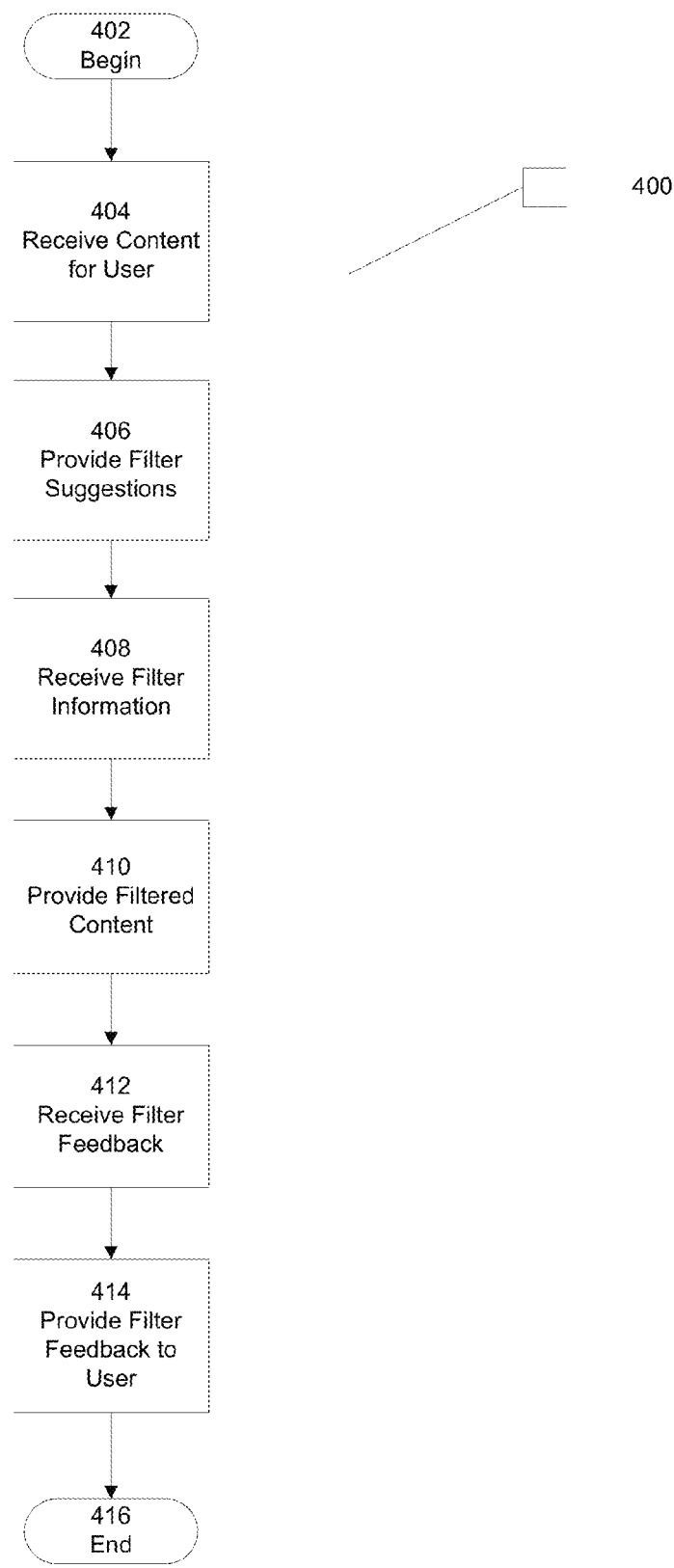
FIG. 4 shows an example process for gathering filter feedback according to an embodiment.

According to an embodiment, a system, such as content control system 222, may provide for a process by which a user may publish, and receive feedback on, content and filters to the content. FIG. 4 illustrates a process 400 for using gathered feedback to improve content and filters in accord with an embodiment. At block 402, process 400 begins. At block 404, a system may receive content for publication from a user. In one example, the content may be a photograph or the set of content may be a photo album. In another embodiment the content may be expressed in other media such as video, audio or text.

At block 406, a system may determine which users and user groups that are relevant to the content received. More specifically, a system may determine that the content is suitable or not suitable to one or more users and user groups. For example, referring to FIG. 3, filter engine 320 may access user history database 318 to retrieve user content and filter preferences and may suggest that the content, with any appropriate filters, may be suitable for specific users and user groups. In a particular instance, filter engine 320 may query user history database 318 using a SQL query configured to retrieve indicators for any of the attributes of content that a user or user group prefers. For example, the SQL query may retrieve one or more subjects of content and the preference information for each subject. User history database 318 may include indexes keyed on user indicators to enable efficient retrieval of the subjects for which the user or user group has preference information. The preference information may indicate both the likes and dislikes of the user or user group.

Once suggested users and user groups have been identified, the system may provide the users and user groups to the producer of the content, along with any suggested filters. The producer of the content may then associate one or more filters with the content and may publish the content with any associated filters to one or more users or user groups. In an example, the user groups may, among other groups, include: all users, friends of the producer, coworkers of the producer, family of the producer, children of the producer and the spouse of the producer. In another example, the user may publish content and filters to all users or to users or user groups based on other attributes of the user or user group such as the content preferences of the user or user group, the publication history of the user or user group, age of the user or average age of the user group, gender of the user or predominate gender of the user group, and geo-based data, such as the current location of a user or user group or the residence of a user or user group.

At block 408, a system may receive filter information selected by the user. The filter information may indicate one or more filters to be associated with the content. The filter information may also include one or more users or user groups to be associated with the content and filters. In one example, the filter may present a region of a photograph. In another example, the filter may prevent presentation of a particular person in a set of photographs.

At block 410, a system may provide the content to one or more users or users groups. The content may be filtered by any filters associated with the content, users or user groups. In the embodiment illustrated in FIG. 3, the content is provided via content interface 312.

At block 412, a system may receive feedback information regarding the quality of the content and filters applied to the content. In the embodiment illustrated in FIG. 3, the feedback information provided by a user and is received via content interface 312. For example, a user may manually enter the feedback information into content interface 312.

At block 414, a system may provide the feedback to the original producer of the content or the original creator of the filter. In one embodiment, this feedback is presented in the form or a relevancy graph. The relevancy graph may depict the content preference, presented with or without a filter, of a user or user group. For example, the relevancy graph may illustrate the preference of filtered content relative to the same content unfiltered. In another example, the relevancy graph may depict the preference for a portion of filtered content relative to the rest of the filtered content. In yet another example, the relevancy graph may depict the preference for content relative to other content stored on content control system 222. Additionally, the feedback may be used to update user and user group content and filter preference information stored in user history database 318.

At block 416, process 400 ends. Thus, a system executing process 400 allows a user to post content and filter, receive feedback regarding the quality of the content and filter and, using the quality information, improve the quality of the content and filter.

Figure 5:
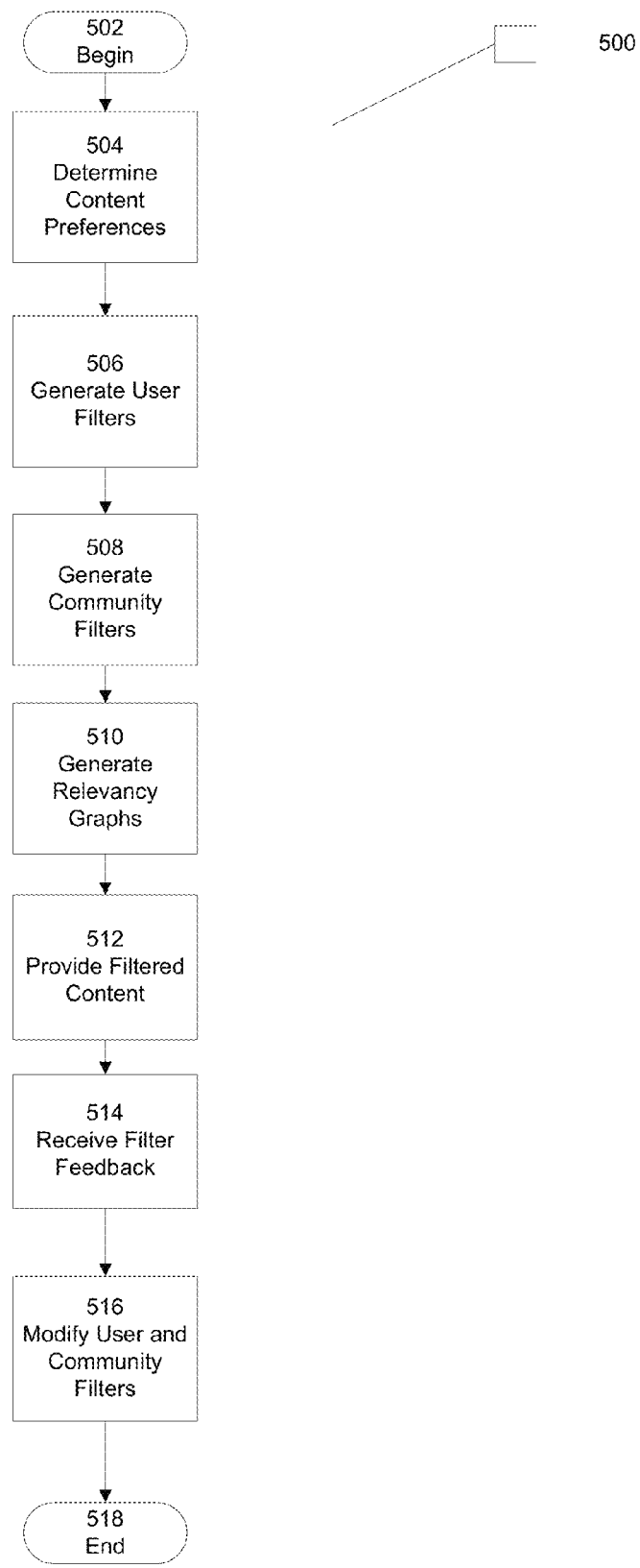
FIG. 5 illustrates an example process for modifying filters using filter feedback according to an embodiment.

FIG. 5 illustrates an alternative process 500 of using gathered feedback to improve content and filters in accord with an embodiment. At block 502, process 500 begins. At block 504, a system may determine the content preferences of a user or user group. For example, in the embodiment illustrated in FIG. 3, content engine 321 determines content preferences and stores content preference information in user history database 318. Content preference information may also be expressly provided to user history database by users via, for example, content interface 312.

At block 506, a system may generate one or more filters. For example, referring to FIG. 3, filter engine 320 may access user history database 318 to retrieve user content preferences and automatically create one or more user filters to provide content according to the gathered preference information. The system may query user history database 318 using a SQL query configured to retrieve indicators for any of the attributes of content that a user or user preferences. For example, the SQL query may retrieve one or more subjects of content and the preference information for each subject. User history database 318 may include indexes keyed on user indicators to enable efficient retrieval of the subjects for which the user has preference information. The preference information may indicate both the likes and dislikes of the user.

At block 508, a system may generate one or more user group filters. For example, referring to FIG. 3, filter engine 320 may access user history database 318 to retrieve user content preferences and automatically create one or more user filters to provide content according to the gathered preference information. As above, the system may query user history database 318 using, for example, a SQL query configured to retrieve indicators for any of the attributes of content that a user or user preferences.

At block 510, a system may generate one or more relevancy graphs. The relevancy graph may depict the relevancy of content, presented with or without a filter, to a user or a group of users. The relevancy graph may depict the content preference, presented with or without a filter, of a user or user group. For example, the relevancy graph may illustrate the preference of filtered content relative to the same content unfiltered. In another example, the relevancy graph may depict the preference for a portion of filtered content relative to the rest of the filtered content. In yet another example, the relevancy graph may depict the preference for content relative to other content stored on content control system 222. Other relevancy graphs exist and the invention is not limited to any particular relevancy graph or collection of graphs.

At block 512, a system may provide content using the generate filters to users and user groups. The content may be filtered by any filters associated with the content, users or user groups. In the embodiment illustrated in FIG. 3, the content is provided via content interface 312.

At block 514, a system may receive feedback regarding the filter from the users and user groups that have experienced content through the filter. In the embodiment illustrated in FIG. 3, the feedback provided by a user and is received via content interface 312. For example, a user may manually enter the feedback information into content interface 312.

At block 518, process 500 ends. Thus, a system executing process 500 automatically generates and continuously improves filters catering to the content preferences of the system's users and user groups.

Each of processes 400 and 500 depicts one particular sequence of acts in a particular embodiment. Other actions can be added, or the order of actions can be altered in this method without departing from the scope of the present invention.

Example User Interface

Figure 6:
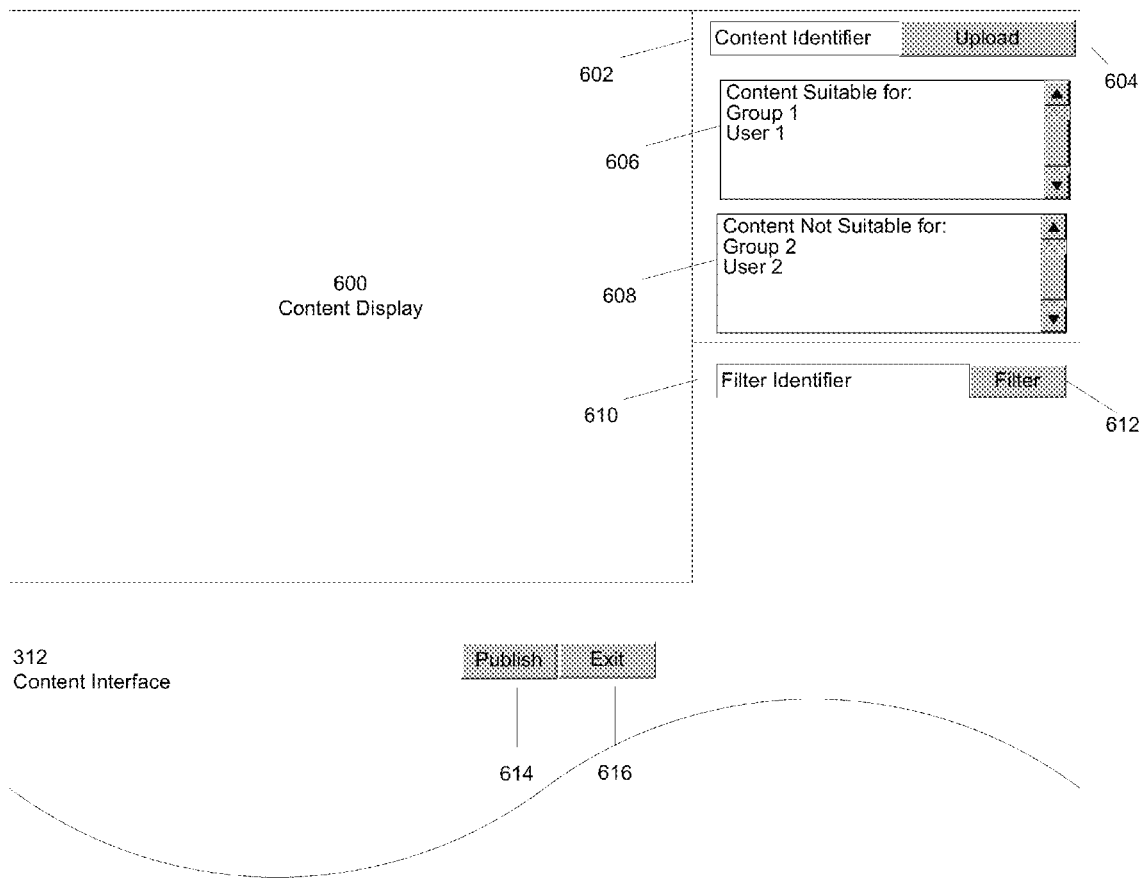
FIG. 6 shows an example interface through which a user may publish content and filters according to an embodiment.

FIG. 6 illustrates one embodiment of content interface 312 and associated user interface elements. As discussed above, content interface 312 may be used to upload content and receive suitability suggestions from content control system 222. Also, as discussed above, content interface 312 may implemented for any computer system including, among other computer systems, desktop computers, laptop computer, and mobile computing devices, such as cellular phones. In one embodiment, content interface 312 is served as one or more web pages and is, therefore, functional on any computer system that is capable of executing a browser. According to the depicted embodiment, content interface 312 may include content display 600 and content identifier 602, upload element 604, content suitability list 606, content non-suitability list 608, filter identifier 610, filter application element 612, publish element 614 and exit element 616.

In one embodiment, content display 600 may present content a user. The content presented may be expressed in any medium supported by content control system 222. Additionally, the content may be filtered using one or more filters to alter the presentation of the content.

Content identifier 602 may allow a user to select content to upload to content control system 222. In one embodiment, actuation of content identifier 602 may cause the system to display a dialogue box. The dialogue box may provide a user with the ability to browser to local and remote storage locations for content. The dialogue box may also provide the user the ability to enter a path to the content that the user wishes to upload. The content may be one portion of content or may be a set of content.

Upload element 604 may allow a user to uploaded content selected in content identifier 602 to content control system 222. More particularly, actuation of upload element 604 may cause a system to transfer the selected content to content control system 222. In the embodiment illustrated in FIG. 3, the uploaded content may be stored in content database 316. In one embodiment, content display 600 continuously presents in the content after the upload is complete.

Content suitability list 606 may present, to a user, a list of users and user groups for which the content is suitable. Content interface 312 may determine this list by comparing the attributes of the content and any metadata describing the content included in content database 316 to the user and user group content preference information included in user history database 318. The user may manually add or remove users and user groups from content suitability list 606 by actuating the list.

Content non-suitability list 608 may present, to a user, a list of users and user groups for which the content is not suitable. Content interface 312 may determine this list by comparing the attributes of the content and any metadata describing the content included in content database 316 to the user and user group content preference information included in user history database 318. In one embodiment, the user may manually add or remove users and user groups from content non-suitability list 608 by actuating the list.

Filter identifier 610 may allow a user to select one or more filters to apply to the uploaded content. In one embodiment, when filter identifier 610 is actuated, content interface 312 may display a list of available filters from which the user may select one or more filter. Content interface 312 may determine which filters are available for selection by referring to filter database 317.

Filter element 612 may allow a user to apply a filter to the uploaded content. In one embodiment, after actuation of filter element 612, content display 600 filters the content according to the selected filter or filters.

Publish element 614 may allow a user to publish content to other users of content control system 222. In one embodiment, when publish element 614 is actuated, the content, including any filters selected in filter identifier 610, is published to the users selected in the content suitability list 606. In another embodiment, when publish element 614 is actuated, the content, including any filters selected in filter identifier 610, is published to all users except those selected in content non-suitability list 608.

Exit element 616 may allow a user to exit content interface 312.

Figure 7:
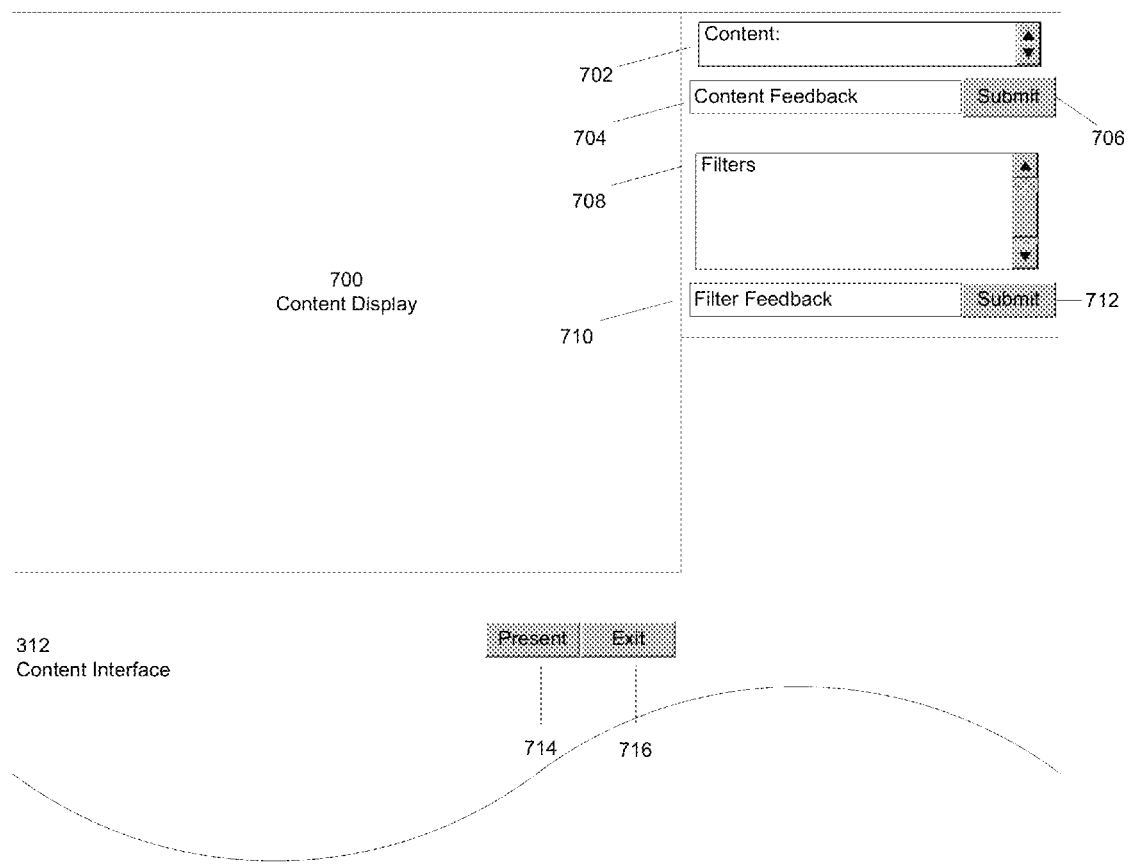
FIG. 7 shows an example interface through which a user may submit feedback regarding content and filters according to an embodiment.

FIG. 7 illustrates another embodiment of content interface 312 and associated user interface elements. A user may use this embodiment of content interface 312 to provide feedback regarding content and filter preferences. According to the depicted embodiment, content interface 312 may include content display 700 and content identifier 702, content feedback element 704, content feedback submit element 706, filter list 708, filter feedback element 710, filter feedback submit element 712, present element 714 and exit element 716.

In one embodiment, content display 700 may present content a user. The content presented may be expressed in any medium supported by content control system 222. Additionally, the content may be filtered using one or more filters to alter the presentation of the content.

Content identifier 702 may allow a user to select content about which to provide feedback. In one embodiment, actuation of content identifier 602 may cause the system to display a dialogue box. The dialogue box may provide a user with the ability to select content stored in content database 316.

Content feedback element 704 may allow a user to indicate content preference information for the content. The feedback may be provided in various forms. In one embodiment, content feedback element 704 may accept a numerical rating of the preference the user ascribes to the content.

Content feedback submit element 706 may allow a user to submit the indicated content preference information. More specifically, when content feedback submit element 706 is actuated content interface 312 may store the feedback information in user history database 318.

Filter list 708 may present, to a user, a list of filters about which to provide feedback. In one embodiment, when filter list 708 is actuated, content interface 312 may display a list of available filters from which the user may select one or more filter. Content interface 312 may determine which filters are available for selection by referring to filter database 317.

Filter identifier 710 may allow a user to indicate filter preference information about the currently selected filter. In one embodiment filter feedback element 704 may accept a numerical rating the preference the user ascribes to the filter. In another embodiment, filter identifier 710 allows a user to provide text based feedback for system or user use.

Filter feedback submit element 712 may allow a user may allow a user to submit the indicated filter preference information. More specifically, when filter feedback submit element 712 is actuated content interface 312 may store the feedback information in user history database 318.

Present element 714 may allow a user to experience the content. More specifically, when present element 714 is actuated, content interface 312 will cause content display 700 to present the currently indicated content in content identifier 702 subject to the filters selected in filter list 708.

Exit element 716 may allow a user to exit content interface 312.

Having now described some illustrative aspects of the invention, it should be apparent to those skilled in the art that the foregoing is merely illustrative and not limiting, having been presented by way of example only. Similarly, aspects of the present invention may be used to achieve other objectives including allowing users to create and sell content and filters enhancing the presentation of the content. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A method comprising:
receiving, at the content control system, the plurality of video items from a first plurality of users;
allowing the plurality of video items to be presented to a second plurality of users that includes a user that is not in the first plurality of users;
causing, by the content control system, to be displayed to a first user, a user interface that includes one or more fields for specifying filter criteria;
receiving, from the first user, at the content control system, through the user interface, one or more filter criteria;
creating a filter based on the one or more filter criteria;
applying, at the content control system, the filter to a first video item of a plurality of video items to create a first filtered video item, wherein the first filtered video item includes a strict subset of the video data or audio data that is included in the first video item;
allowing the first filtered video item to be presented to one or more first users;
applying, at the content control system, the filter to a second video item of the plurality of video items to create a second filtered video item;
allowing the second filtered video item to be presented to one or more second users;
wherein the method is performed by one or more computing devices.

2. The method of claim 1, further comprising:
prior to creating the filter, storing a particular filter that is associated with one or more particular filter criteria;
wherein creating the filter comprises adding the one or more filter criteria to the particular filter to create a modified filter;
wherein applying the filter comprises applying the modified filter.

3. The method of claim 2, wherein adding the one or more filter criteria comprises replacing the one or more particular filter criteria with the one or more filter criteria.

4. A method comprising:
receiving, at a content control system, from a first user, first content and one or more first filter criteria for a first filter;
receiving, at the content control system, first target data;
based on the first target data, associating the first filter with a first group of users;
applying the first filter to the first content to generate filtered content;
receiving, from a user in the first group of users, at the content control system, a request for the first content;
in response to receiving the request and the user being in the first group of users, sending the filtered content to the user;
receiving, at the content control system, from a second user that is different than the first user, second content and one or more second filter criteria for a second filter that is different than the first filter;
receiving, at the content control system, second target data;

based on the second target data, associating the second filter with a second group of users that is different than the first group of users and that may request the second content;

wherein the method is performed by one or more computing devices.

5. The method of claim 4, wherein:
receiving the one or more first filter criteria comprises receiving the one or more first filter criteria from a first user;
receiving the one or more second filter criteria comprises receiving the one or more second filter criteria from a second user that is different than the first user.

6. The method of claim 4, wherein the first target data indicates each user in the first group of users.

7. The method of claim 4, wherein:
the first target data indicates an attribute that is shared by each user in the first group of users;
the method further comprising determining the first group of users based on the attribute.

8. A method comprising:
receiving, at a content control system, content items from a first plurality of users;
allowing the content items to be presented to a second plurality of users that includes a user that is not in the first plurality of users;
receiving, at the content control system, from a first user, filter data that specifies one or more filter criteria;
in response to receiving the filter data, creating a filter based on the one or more filter criteria;
receiving, at the content control system, from a second user that is different than the first user, filter modification data;
in response to receiving the filter modification data, modifying the filter based on the filter modification data to generate a modified filter;
wherein the method is performed by one or more computing devices.

9. The method of claim 8, further comprising, prior to receiving the filter modification data:
receiving, at the content control system, from a third user that is different than the first user, a request for content;
applying the filter to the content to generate filtered content;
causing the filtered content to be presented to the third user.

10. The method of claim 8, further comprising, after modifying the filter:
receiving, at the content control system, from a third user that is different than the first user, a request for content;
applying the modified filter to the content to generate filtered content;
causing the filtered content to be presented to the third user.

11. A system comprising:
one or more processors;
one or more storage media storing instructions which, when executed by the one or more processors, cause:
receiving, at the content control system, the plurality of video items from a first plurality of users;
allowing the plurality of video items to be presented to a second plurality of users that includes a user that is not in the first plurality of users;
causing, by the content control system, to be displayed to a first user, a user interface that includes one or more fields for specifying filter criteria;
receiving, from the first user, at the content control system, through the user interface, one or more filter criteria;
creating a filter based on the one or more filter criteria;
applying, at the content control system, the filter to a first video item of a plurality of video items to create a first filtered video item, wherein the first filtered video item includes a strict subset of the video data or audio data that is included in the first video item;
allowing the first filtered video item to be presented to one or more first users;
applying, at the content control system, the filter to a second video item of the plurality of video items to create a second filtered video item;
allowing the second filtered video item to be presented to one or more second users.

12. The system of claim 11, wherein the instructions, when executed by the one or more processors, further cause:
prior to creating the filter, storing a particular filter that is associated with one or more particular filter criteria;
wherein creating the filter comprises adding the one or more filter criteria to the particular filter to create a modified filter;
wherein applying the filter comprises applying the modified filter.

13. The system of claim 12, wherein adding the one or more filter criteria comprises replacing the one or more particular filter criteria with the one or more filter criteria.

14. A system comprising:
one or more processors;
one or more storage media storing instructions which, when executed by the one or more processors, cause:
receiving, at a content control system, from a first user, first content and one or more first filter criteria for a first filter;
receiving, at the content control system, first target data;
based on the first target data, associating the first filter with a first group of users;
applying the first filter to the first content to generate filtered content;
receiving, from a user in the first group of users, at the content control system, a request for the first content;
in response to receiving the request and the user being in the first group of users, sending the filtered content to the user;
receiving, at the content control system, from a second user that is different than the first user, second content and one or more second filter criteria for a second filter that is different than the first filter;
receiving, at the content control system, second target data;
based on the second target data, associating the second filter with a second group of users that is different than the first group of users and that may request the second content.

15. The system of claim 14, wherein:
receiving the one or more first filter criteria comprises receiving the one or more first filter criteria from a first user;
receiving the one or more second filter criteria comprises receiving the one or more second filter criteria from a second user that is different than the first user.

16. The system of claim 14, wherein the first target data indicates each user in the first group of users.

17. The system of claim 14, wherein:
the first target data indicates an attribute that is shared by each user in the first group of users;
the instructions, when executed by the one or more processors, further cause determining the first group of users based on the attribute.

18. A system comprising:
one or more processors;
one or more storage media storing instructions which, when executed by the one or more processors, cause:
    receiving, at a content control system, content items from a first plurality of users;
    allowing the content items to be presented to a second plurality of users that includes a user that is not in the first plurality of users;
    receiving, at the content control system, from a first user, filter data that specifies one or more filter criteria;
    in response to receiving the filter data, creating a filter based on the one or more filter criteria;
    receiving, at the content control system, from a second user that is different than the first user, filter modification data;
    in response to receiving the filter modification data, modifying the filter based on the filter modification data to generate a modified filter.

19. The system of claim 18, wherein the instructions, when executed by the one or more processors, further cause, prior to receiving the filter modification data:
    receiving, at the content control system, from a third user that is different than the first user, a request for content;
    applying the filter to the content to generate filtered content;
    causing the filtered content to be presented to the third user.

20. The method of claim 18, wherein the instructions, when executed by the one or more processors, further cause, after modifying the filter:
    receiving, at the content control system, from a third user that is different than the first user, a request for content;
    applying the modified filter to the content to generate filtered content;
    causing the filtered content to be presented to the third user.

* * * * *